United States Patent [19]

Ducloux

[11] Patent Number: 4,457,420
[45] Date of Patent: Jul. 3, 1984

[54] APPARATUS FOR DIVERTING OBJECTS FROM A MAIN CONVEYOR PATH

[75] Inventor: Marcel L. Ducloux, Le Pecq, France

[73] Assignee: Saint-Gobain Emballage, France

[21] Appl. No.: 355,612

[22] Filed: Mar. 8, 1982

[30] Foreign Application Priority Data

Mar. 9, 1981 [FR] France .................................. 81 04671

[51] Int. Cl.³ ....................... B65G 47/41; B65G 47/32
[52] U.S. Cl. .................................... 198/369; 198/438; 198/689; 209/523; 209/643
[58] Field of Search ............... 198/438, 437, 436, 440, 198/369, 372, 689; 209/522, 523, 643, 653, 657

[56] References Cited

U.S. PATENT DOCUMENTS

| | | | |
|---|---|---|---|
| 3,133,638 | 5/1964 | Calhoun | 209/643 X |
| 3,193,280 | 7/1965 | Gutierrez | 198/689 X |
| 4,089,420 | 5/1978 | Sundman | |
| 4,273,235 | 6/1981 | Rustand | 198/437 X |

FOREIGN PATENT DOCUMENTS 2347563 4/1975 Fed. Rep. of Germany .
2047373 3/1971 France .

Primary Examiner—Jeffrey V. Nase
Attorney, Agent, or Firm—Pennie & Edmonds

[57] ABSTRACT

Apparatus for diverting an object from a main path of movement which shall have been sensed as displaying a defect or irregularity includes a pusher fixedly located along the main path and an auxiliary conveyor which extends into the main path. The auxiliary conveyor includes a belt disposed substantially parallel to the axis of the object, having a plurality of contiguous cups providing a passive suction for retention of the object, and the auxiliary conveyor moves along a path at least slightly oblique to the main path. The pusher includes an operator movable rapidly through a stroke of movement whose length is less than the diameter of the object to divert the object from the main to the auxiliary path of movement.

14 Claims, 1 Drawing Figure

U.S. Patent  Jul. 3, 1984  4,457,420
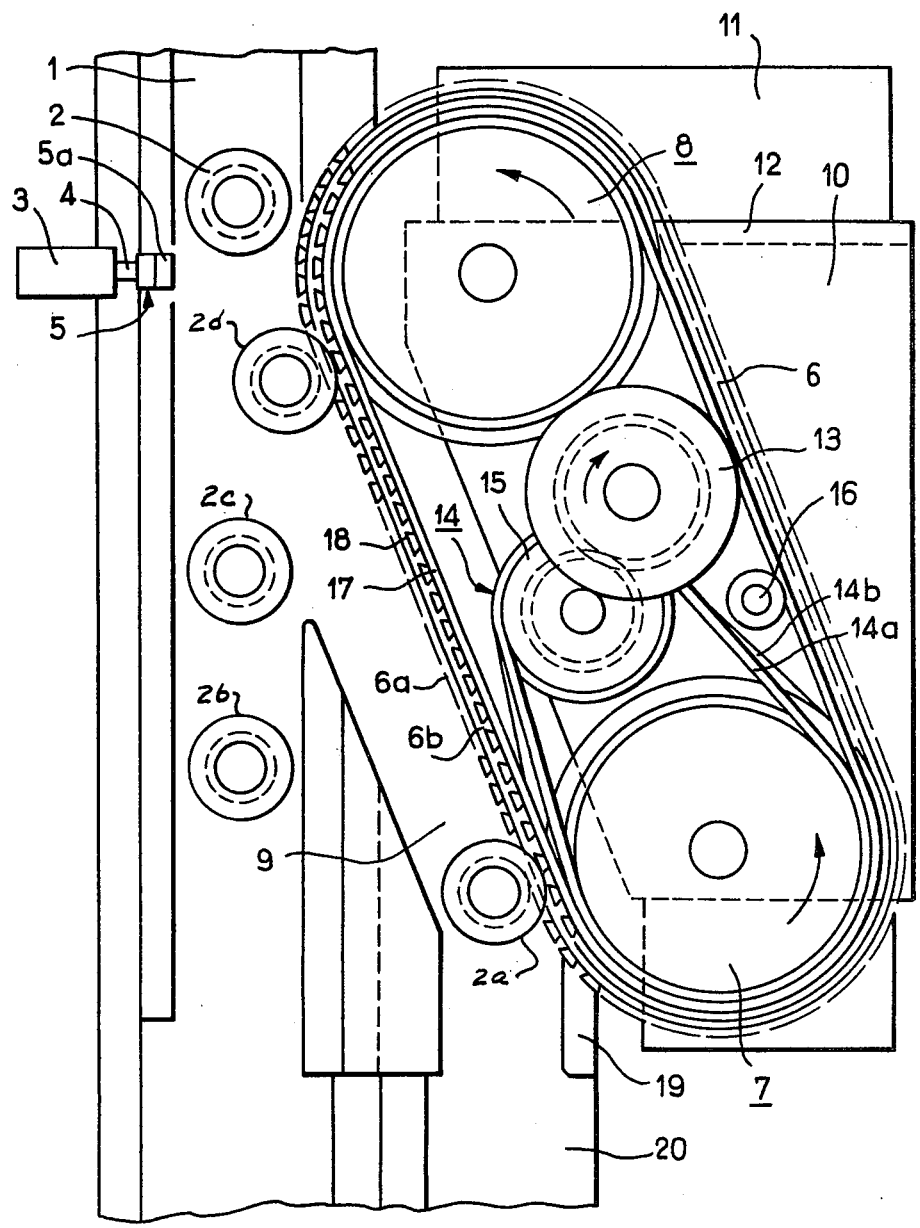

APPARATUS FOR DIVERTING OBJECTS FROM A MAIN CONVEYOR PATH

DESCRIPTION

1. Technical Field

The invention relates to apparatus for use with a system for conveying continuously objects from an upstream to a downstream location. The apparatus includes an operator unit for diverting an object sensed to be defective or irregular in some regard from the main path to a secondary path of movement and an auxiliary conveyor apparatus for retaining and moving the diverted object along the secondary path of movement.

2. Background Art

In many industries there is a requirement to convey objects in a downstream direction along a path of movement from one operational station to the next and subsequent operational stations. The objects which are conveyed may be glass bottles moving from an upstream fabrication location or along a bottling line, for example. Typically, the bottles are required to move at a fast rate. More often than not, the bottles exhibit a symmetry with respect to an axis perpendicular to their base, such as a symmetry of revolution, so that the bottles may be supported in a vertical attitude for movement on a horizontal conveyor. It is also typical that various operative systems are located at positions along the main path of movement for removing bottles from the main path of movement and, after completion of one or more operative steps, returning the bottles, once again, to the conveyor. These operative systems may comprise a cam system, and the bottles may be removed by a rotational device or cylinder equipped with gripping jaws or star wheels which functions to move the bottles either continuously or in a step-by-step advance to the various operational or work stations.

The criterion of operation of systems of this type may dictate that bottles are to be diverted from the main path of movement in a different manner. This is particularly the case when the bottle to be diverted is diverted from the main path of movement after passing a check point or sensing location which commands the necessity to divert a specific bottle or bottles that exhibit a sensed defect or irregularity which would render it unfit for the use for which it is intended. This may also be the case with systems for conveying continuously bottles along a bottling line whereby it may be beneficial to divert some of the bottles to an alternate path of movement or to regroup the bottles to a downstream location to the main path of movement.

In the event that the bottle or bottles to be diverted from the main path of movement are bottles which exhibit a sensed defect or irregularity, it is common to locate an ejector apparatus alongside the main path of movement and, upon activation of an operator, a bottle may be pushed crosswise and diverted laterally toward a chute or other means for receiving and directing the bottle to an ejection station. The ejector apparatus may be controlled pneumatically, and the operator may be movable throughout a distance on the order of the width or diameter of the bottle to be diverted. If the bottle is of relatively light construction, the ejector apparatus may comprise a nozzle capable of emitting a jet of air synchronized to the speed of movement of the bottle and of a sufficient magnitude to diver the bottle laterally toward the chute.

The apparatus previously discussed exhibit certain advantages. For example, the apparatus are of relatively simple construction in that they are neither dependent on the dimensions of the bottle to be diverted nor on the intervals between bottles during their movement along the main path of movement. These apparatus, also, may be relatively easily adjusted to accommodate changes in the manufacturing line to synchronize and, if necessary, to orient the ejector apparatus to the movement of the bottle to be diverted.

If, on the other hand, it is required not only to divert a bottle but also to intercept the bottle as it passes along the main path of movement, the operation must be made very gently. However, at higher rates, the action of the ejector apparatus necessarily will become more forceful and the overall operation becomes increasingly delicate. To this end, even though a defective bottle is involved it is desirable to divert the bottle with precaution that the bottle not be damaged to any greater degree. In this manner the bottle may be subjected to testing thereby to determine and correct the cause or causes for the defect or irregularity. It is also necessary to avoid contact with other bottles which may be contiguous to the bottle which is diverted thereby to obviate overturning, damaging or simply a shifting in orientation of bottles which should pass along the main path of movement.

German Offenlegungsschrift No. 23 47 563 relates to apparatus including means for guiding objects along a path of movement, retention means for retention of objects removed from the guiding means, which objects ultimately are discharged from the apparatus at a location different from the location at which objects moving along the path of movement are discharged from the apparatus, and a pusher for engaging an object as the object passes so that the object is removed from the guiding means and retained by the retention means. The retention means may be a star wheel including a plurality of sockets locked by an elastic clamp.

While the apparatus may operate satisfactorily in the guiding and retention of objects, it has been found that the action of the pusher during movement of the star wheel at a high rate is extremely rough.

The prior art also indicates that consideration has been directed to the combination of a pusher and an auxiliary elastic wheel which function to divert an object from a main path of movement. The operation is such that the object is diverted toward the auxiliary elastic wheel, providing a stop, and held against the elastic wheel by the pusher. If this action continues for sufficient time, the object will relocate from the main path of movement along a path dictated by the elastic wheel toward an auxiliary conveyor leading to a chute. It has been found that the stroke of the pusher, relative to other prior art practices, may be reduced, that its action may be carried out with less impact and greater safety to objects, but also has been found that rapidity of operation is limited.

The prior art also includes cylinders equipped with grasping units to move objects, such as bottles about a vertical axis through successive inspection locations at which the bottles are checked for defects or irregularities. The grasping units are operated by hydraulic and quite often electromagnetic jacks which accompany the bottles during movement and function in sorting. Generally, the bottles placed opposite these parts on the cylinder are grasped immediately, then, as a safety precaution, released to the main path of movement in the event that no defect or irregularity is detected at any one of the inspection points. The bottles, however, are held beyond the point of release of other bottles if a defect or irregularity is detected, and these bottles are transferred to an auxiliary conveyor for movement to a rejection station. The grasping units may be magnetically controlled clamps. If the system is one which does not require rotation of the bottles on their axes, the grasping units may take the form of cups connected to a source of vacuum during a particular period of time for grasping the bottle, and disconnected from the source of vacuum and returned to atmospheric pressure for release of the bottle to the main path of movement.

The apparatus described above, while generally providing a safe level of operation, is not without its drawbacks. For example, the grasphing units must accommodate to the size of the bottle to be handled. The grasping unit capable of adjusting to size, of necessity, may be relatively complex in construction, as well as operation, and oftentimes this complexity militates against satisfactory optical detection. Further, it often is difficult to adjust the grasping units and virtually impossible to adjust the grasping units to accommodate to manufacturing changes without downtime in operation and extensive maintenance activity. Additionally, it is considered that this apparatus does not lend itself extremely well to systems of operation requiring high rates of movement, and wherein inspection during movement is desired.

SUMMARY OF THE INVENTION

The invention is one which remedies the deficiencies of the prior art, and, in particular, relates to a sorting or diverting apparatus for use with a system which may be a system for conveying continuously objects along a main path of movement from an upstream to a downstream location including an operator at a fixed location along the main path for diverting, without grasping, an object to an auxiliary conveyor. The auxiliary conveyor both retains and carries the diverted object to a rejection point. A particularly important aspect of the invention is that the operator functions rapidly with a short, weak stroke, for reduction of the forces of impact and any roughness to the object which is diverted.

According to the invention, the auxiliary conveyor against which the operator diverts objects upon command of an upstream sensor includes a belt whose surface is substantially parallel to the object to provide a stop supporting plurality of suction cups. The cups, which may be likened somewhat to those used in conveying plate glass, are located in a tight network of contiguous cups.

The cups, however, are relatively small and, preferably, passive in nature. The belt extends into the main path of movement of objects yet follows a path oblique to the main path of movement toward a rejection station. The auxiliary path may terminate at a discharge chute or a second conveyor. A guide or camming means is located downstream of the auxiliary path for purposes of separating the diverted object from the cups upon which it was retained.

The apparatus of the present invention may be used for diverting objects irrespective of their size and irrespective of the interval of objects moving along the main path of movement. It includes a single pusher permanently located along the main path of movement, controlled with an adjustable delay following the sensing of an irregular or defective bottle, capable of functioning irrespective of an accidental variation in the spacing of bottles. Further, the apparatus of the present invention is readily easily adaptable to existing systems for conveying continuously objects along a main path of movement, such as a bottling line and, further, the apparatus exhibits the advantage of utility in the diverting of objects irrespective of their shape and size. As indicated, the cups for retaining the object or bottle requires no external source of vacuum and, therefore, are simpler, less costly in construction, and, it is believed, more reliable in operation than suction devices of the prior art.

It is possible to replicate the apparatus generally discussed above and more particularly described below along a main path of movement for purposes of diverting objects to any one of several auxiliary conveyors or diverting objects to several paths of movement by longitudinally offsetting one apparatus from another apparatus and by commanding a plurality of operators to respond to different sorting signals, emitted by different sensors. If the several sorting signals correspond to different types of defect, for example, to a defect in glaze, or a nick, or an improper fill within the bottle, those objects which exhibit the same defect may be sorted or diverted from the main path of movement by the same operator for collection at the same rejection point. This type of collection facilitates both examination and correction of the cause of a defect which may occur in one or more bottles.

BRIEF DESCRIPTION OF THE DRAWING

The FIGURE is a diagrammatic view in plan of apparatus for diverting conveyed objects from a path of travel according to the invention.

BEST MODE FOR CARRYING OUT THE INVENTION

The apparatus of the present invention has particular utility of use with a system which may be a system for conveying continuously objects along a main path of travel from an upstream to a downstream location, thereby to function following a command signal to divert an object or any one or more of several objects from that path, for any reason. The continuous system may be designed for conveying objects, such as bottles from an upstream fabrication or production location, or for conveying bottles along a bottling line, and the apparatus of the present invention will function to divert bottles which may be of any particular size and outline, such as a bottle of cylindrical, flat or complex outer shape.

Referring to the FIGURE, the conveying system includes a conveyor represented by a belt 1, only a short length of the belt is shown, which may be supported in any manner thereby to follow a horizontal run. A bottle 2, as previously discussed, is moved by the conveyor system in the downstream direction (movement from the top of the FIGURE to the bottom). Several bottles 2, 2a, 2b, 2c and 2d are illustrated in the FIGURE, and bottle 2d is illustrated as having just been diverted from the main path along which bottles 2b and 2c are moving. Bottle 2a, having previously been diverted, is illustrated in position along the auxiliary path, followed by bottle 2d. The bottles are disposed in a vertical or standing disposition during movement.

Particulars of the conveyor, such as the mounting, drive and construction of belt 1, other than that it is capable of supporting the bottles in movement downstream, are of no real concern to the overall invention and may be considered conventional.

In any continuous system, such as those previously described, it may be necessary to divert a bottle or bottles from the main path of movement because of some sensed irregularity. Sensing apparatus are well-known; and various sensing apparatus may be employed to sense an irregularity, such as a poorly shaped bottle, or a bottle having an improper volume of fill, or improper glaze, or nick, and so forth, and then to signal a command to a downstream apparatus to carry out the operation of diverting the proper bottle from the main path of movement.

A jack 3 forming a part of the diverter apparatus is disposed alongside belt 1 in a position that an operator comprising a rod 4 and pusher 5 following movement in one direction will extend partially into the main path. The jack is a double-action device and during normal operation the operator locates to the position illustrated in the FIGURE. Upon command, however, the operator is moved rapidly to extend into the main path to contact a bottle and divert the bottle from the main path of movement. The jack may be controlled in any manner, for example, by electromagnetic, pneumatic or hydraulic means, and any particular manner of mounting the jack in the accomplishment of the discussed mode of operation may be employed.

A bottle, such as bottle 2d, may be diverted from the main path of movement upon command, when subjected to a relatively short linear stroke of the operator. The bottle may be diverted because of a sensed irregularity, and if a plurality of sensors, each responsive to a specific irregularity, are employed bottles may be diverted, and in effect also sorted, along different paths extending from the main path of movement. As may be appreciated, the operator of jack 3 will function after some prescribed time delay equivalent to the time required for the bottle to travel to the fixed location of the jack.

An auxiliary conveyor is located alongside belt 1. The conveyor includes a belt 6 and a pair of drums 7, 8, both of which are mounted for movement about a vertical axis.

The diverter apparatus is supported by a stationary frame, a portion of which is depicted by a support 11. A plate 10 is carried by the support and a pair of stub shafts or the equivalent are mounted on the plate. Each drum is carried by a stub shaft for movement rotationally with the stub shaft or relative to the stub shaft. Motor 13 is also mounted on plate 10 for driving one or the other of drums 7, 8. Particularly, drum 7 is the driven drum, and drum 8 is the idler drum.

A pulley 15 is mounted on plate 10 in a manner similar to the mounting of drums 7, 8, and a belt 14 is entrained about both the pulley and drum 7. The pulley, in turn, is driven by the output shaft of motor 13. A tightener for belt 14 may be provided as shown at 16.

Belt 6 is a continuous belt, arranged in a vertical plane so that its external face is substantially parallel to the axis of a bottle or, more precisely, to the generatrix of its body.

Plate 10 is adjustable relative to support 11 for purposes of locating idler drum 8 and belt 6 relative to the main path of movement of bottles 2. To this end, plate 10 is carried by a slide 12 whereby belt 6 may be located for movement along a path generally oblique to the main path, and idler drum 8 is located so that belt 6 traverses slightly above and within the main path of movement and its stub shaft is in the plane of travel of the operator of jack 3. Motor 13 drives belt 6 at a speed whereby a bottle, such as the bottles 2a, 2d, will move along a chute 9 at a speed substantially equal to the speed of movement of a bottle, such as bottle 2b, along the main path of movement.

Belt 6 comprises an inner layer 17 of a flexible elastic material and an outer layer which supports a plurality of cups 18, arranged in a tight, continuous network. Each cup may be connected to an external source of suction, but preferably the cups are passive. The network of cups comprise alternate rows of contiguous cups of sufficient number so that several cups may contact the body of a bottle which shall have been diverted at the same time, and at an appropriate height. The cups are relatively small in diameter. To this end, each cup may have a diameter of about one-tenth to about one-fifth that of a bottle 2.

As previously indicated, when a sensor, upstream of jack 3, responds to an irregularity, the jack is commanded into operation after a prescribed time delay and the operator diverts a bottle from the main path of movement whereby it is pressed against and "picked up" by the suction of a plurality of cups 18 to travel with belt 6 along chute 9. A tip 5a of a flexible or resilient material may be supported on pusher 5 and together the layer 17 of belt 6 function to reduce or eliminate shock by absorption as the pusher through a rapid, short stroke movement of the operator contacts a bottle. The stroke of the operator may be kept short by proper location of idler drum 8 and belt 6, as discussed; and for any given rate, even up to high rates of transfer bottles may be diverted from the main path of movement to chute 9 under conditions of virtually no shock. The bottle, therefore, will not be damaged to any further degree. The operator quickly returns to the illustrated position so as not to interfere with bottles following seriatim.

Bottle 2d, as bottle 2a, moves with belt 6 toward a guide 19 situated downstream within the region of drum 7. The guide is a passive device which functions to separate the bottle from the several cups, whereupon the bottle may be moved to a rejection point (not shown), further downstream. This movement follows a belt 20 of an auxiliary conveyor mounted substantially like that of belt 1 of the main conveyor.

The apparatus of the invention has the virtue of simplicity both of construction and operation, yet it provides extreme reliability and versatility for use with apparatus for continuously conveying objects, such as bottles from a fabrication or production location or bottles along a bottling line. As previously indicated, the apparatus may be used to divert bottles of any particular size and outline, such as bottles having cylindrical, flat and complex outer faces or shapes.

As to the latter, it is contemplated to utilize, in addition to belt 6, a plurality of belts 6a, 6b, 6n which are juxtaposed one another, although somewhat offset. At least idler drum 8 comprises a plurality of interchangeable drum sections having differing diameters superposed in a stack to substantially complement the outer surface of the bottle(s) moving along the main path of movement. The drive drum 7 may be similarly defined. Nevertheless, the several belts, entrained around the drum sections of idler drum 8 will be properly located with respect to the operator of jack 3, and the several cups on the belts, each having some capability of yielding movement around their necks connecting with the belt, will accommodate to the outer surface of the bottle.

The peripheral speed of movement of all belts 6, 6a, 6b, 6n is the same. To this end, pulley 15 may include a plurality of grooves, equal in number to the number of belts, each groove being of the same diameter, with each drum section being driven by a separate belt 14, 14a, 14b, 14n.

I claim:

1. An apparatus for diverting selected objects from a stream of objects moving seriatim along a main, horizontal path of movement including diverting means having an operator capable of movement in a direction generally transverse to said main path through a stroke whose length is less than the width of said selected object to be diverted, an auxiliary means of conveyance for moving each selected object diverted from said main path toward a discharge station, said auxiliary conveyance means extending partially into said main path and including suction means for supporting each selected object in movement, means for locating said diverting means in a position along said main path whereby said stroke of said operator is directed substantially toward the portion of said auxiliary conveyance means extending partially into said main path.

2. The apparatus of claim 1 wherein said auxiliary conveyance means includes a belt located from movement in an orientation turned toward each selected object to be diverted from said main path, and wherein said suction means includes a plurality of cups arranged in a closely contiguous array of cups.

3. The apparatus of claim 2 wherein said cups are of a diameter less than the diameter of said diverted object for providing a passive suction capability in supporting said diverted object.

4. The apparatus of claim 2 wherein said belt is movable along an auxiliary path of movement oblique to said main path and wherein said auxiliary path also extends partially within said main path.

5. The apparatus of claim 4 further including a guide, said guide located along said auxiliary path for separating said diverted object from said suction means.

6. The apparatus of claim 4 including a pair of drums including an upstream and a downstream drum, means mounting said drum for movement about vertical axes, means driving one of said drums at a constant rotational speed, each said belt being entrained about said drums at a position above said horizontal path of movement, and said axis of rotation of said upstream drum located substantially in the plane of said operator stroke.

7. The apparatus of claim 6 wherein at least said upstream drum is formed by a plurality of superposed, interchangeable drum sections having the same or different diameters.

8. The apparatus of claim 7 wherein said downstream drum is formed by a plurality of superposed, interchangeable drum sections having the same or different diameter.

9. The apparatus of claim 8 including a pulley, said pulley including a plurality of grooves, equal in number of the number of drum sections, and of equal diameter, a plurality of belts entrained within individual grooves and about individual drum sections of said downstream drum, and said drive means connected to said pulley.

10. An apparatus for diverting an object from a main, horizontal path of movement including an operator movable in a direction generally transverse to said main path through a stroke whose length is less than the width of said object to be diverted, means for locating said operator in a position along said main path, and an auxiliary means of conveyance for moving said diverted object toward a discharge station, said auxiliary means including a plurality of belts, each located for movement in an orientation turned toward said diverted object, individually adjustable in position, and moving at the same speed, and suction means for supporting said object in movement including a plurality of cups arranged in a closely contiguous array of cups.

11. The apparatus of claim 10 including a pair of drums including an upstream and a downstream drum, means mounting said drum for movement about vertical axes, means driving one of said drums at a constant rotational speed, each said belt being entrained about said drums at a position above said horizontal path of movement, and said axis of rotation of said upstream drum located substantially in the plane of said operator stroke.

12. The apparatus of claim 11 wherein at least said upstream drum is formed by a plurality of superposed, interchangeable drum sections having the same or different diameters.

13. The apparatus of claim 12 wherein said downstream drum is formed by a plurality of superposed, interchangeable drum sections having the same or different diameter.

14. The apparatus of claim 13 including a pulley, said pulley including a plurality of grooves, equal in number of the number of drum sections, and of equal diameter, a plurality of belts entrained within individual grooves and about individual drum sections of said downstream drum, and said drive means connected to said pulley.

* * * * *

UNITED STATES PATENT AND TRADEMARK OFFICE
CERTIFICATE OF CORRECTION

PATENT NO. : 4,457,420
DATED : July 3, 1984
INVENTOR(S) : Marcel L. Ducloux

It is certified that error appears in the above-identified patent and that said Letters Patent are hereby corrected as shown below:

Column 1, line 67, "diver" should be --divert--.

Column 3, line 15, "grasphing" should be --grasping--.

Column 7, line 16, "said" should be --each--.

Signed and Sealed this

Nineteenth Day of March 1985

[SEAL]

Attest:

DONALD J. QUIGG

Attesting Officer

Acting Commissioner of Patents and Trademarks